US007129884B1

(12) United States Patent
Tehrani et al.

(10) Patent No.: US 7,129,884 B1
(45) Date of Patent: Oct. 31, 2006

(54) MULTIPLE ANTENNA RADAR SIGNAL DETECTION AND ESTIMATION

(75) Inventors: Ardavan Maleki Tehrani, Menlo Park, CA (US); Xiaoru Zhang, Sunnyvale, CA (US); Paul J. Husted, San Jose, CA (US); Jeffrey M. Gilbert, Sunnyvale, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 92 days.

(21) Appl. No.: 10/884,785

(22) Filed: Jul. 1, 2004

Related U.S. Application Data

(63) Continuation-in-part of application No. 10/138,953, filed on May 3, 2002, now Pat. No. 6,891,496.

(51) Int. Cl.
*G01S 7/40* (2006.01)
*G01S 7/285* (2006.01)
*G01S 7/35* (2006.01)
*G01S 13/00* (2006.01)

(52) U.S. Cl. ............................ 342/20; 342/13; 342/52; 342/58; 342/89; 342/175; 342/195

(58) Field of Classification Search ........ 370/328–337, 370/250, 343; 455/436, 500, 501, 807, 509, 455/527, 67.11, 67.13; 342/13–20, 27, 28, 342/52, 58–60, 82–103, 159, 162, 175, 195
See application file for complete search history.

(56) References Cited

U.S. PATENT DOCUMENTS

| | | | |
|---|---|---|---|
| 6,697,013 B1 * | 2/2004 | McFarland et al. | 342/159 |
| 6,831,589 B1 * | 12/2004 | Shearer, III | 342/20 |
| 6,870,815 B1 * | 3/2005 | McFarland et al. | 370/250 |

OTHER PUBLICATIONS

T. Korakis et al., "Link Quality based Association Mechanism in IEEE 802.11h compliant Wireless LANs"; no date given; no publication place given.*
M. See, "802.11h helps WLANs share spectrum"; NETWORKWORLD; Jul. 19, 2004 issue; posted on the Internet at www.networkworld.com.*

* cited by examiner

*Primary Examiner*—Bernarr E. Gregory
(74) *Attorney, Agent, or Firm*—Bever, Hoffman & Harms, LLP; Jeanette S. Harms

(57) ABSTRACT

A radar detection technique in a WLAN device can include a short pulse detection technique and a long pulse detection technique that can be performed using multiple receive chains. Short pulse detection is particularly effective when the incoming signal includes one or a limited number of main pulses and some residual pulses. In contrast, long pulse detection is particularly effective when the incoming signal is longer, thereby allowing various characteristics of the incoming signal to be accurately measured.

33 Claims, 7 Drawing Sheets

MULTIPLE ANTENNA RADAR SIGNAL DETECTION AND ESTIMATION

CROSS-REFERENCE TO RELATED APPLICATION

The present application is a continuation-in-part of U.S. patent application Ser. No. 10/138,953, entitled "Method and Apparatus For Physical Layer Radar Pulse Detection and Estimation", filed on May 3, 2002 now U.S. Pat. No. 6,891,496 by Atheros Communications, Inc., which is incorporated by reference herein.

BACKGROUND OF THE INVENTION

1. Field of the Invention

The present invention relates generally to wireless communications, and in particular to multiple antenna radar signal detection.

2. Discussion of the Related Art

Wireless local area network (WLAN) devices coexist with radar systems in the 5 GHz frequency bands. Radar systems could be used by military, aviation, meteorological, and other governmental agencies. Because of the importance of these radar systems, interference mitigation techniques are required to enable WLAN devices to share these frequency bands. In general, WLAN devices are required to detect an interference with a radar source and avoid using the frequencies used by that radar source.

To this end, various regulatory standards (e.g. the draft European Telecommunications Standards Institute (ETSI) EN 301 893, version V1.2.1, published 2002) require that a dynamic frequency selection (DFS) feature be incorporated in 5 GHz WLAN devices. This DFS feature should switch operating channels in the presence of co-channel radar and uniformly spread operation across a wide frequency range.

Various guidelines for radar detection have been proposed. For example, one proposed guideline includes detecting and avoiding only radar signals above a certain predefined threshold, such as −62 dBm. In one implementation, detection is based on a simple algorithm to determine whether there are any instances of signals above the −62 dBm threshold during a ten second startup listening period. Another proposed guideline includes periodically suspending all network traffic during normal operation and listening in a startup mode for any signals above the −62 dBm threshold level. Unfortunately, because of increased network traffic in the 5 GHz frequency band and the need for increased bandwidth among WLAN devices, these proposed guidelines are generally unsatisfactory.

Therefore, a need arises for improved radar detection and avoidance techniques.

SUMMARY OF THE INVENTION

Various regulatory and standards bodies promulgate standards to define how wireless devices should operate in certain frequency bands. The 5 GHz frequency band is of particular importance to regulatory authorities because of radar systems operating in portions of this band. Radar systems could be used by military, aviation, meteorological, and other governmental agencies. Therefore, because of the importance of these radar systems, wireless devices operating in the 5 GHz frequency bands must be able to detect radar and avoid any frequencies used by the radar systems.

In accordance with one aspect of the invention, a wireless local area network (WLAN) device can detect and analyze various characteristics of an incoming signal to determine if that signal could be radar. If the incoming signal is identified as a radar signal, i.e. a signal having priority in that frequency spectrum, then the WLAN device stops communication in that spectrum. If the incoming signal is not a radar signal, then the WLAN device can continue communication in that frequency spectrum or not, depending on other factors considered by the WLAN device.

In one embodiment, a radar detection technique in a WLAN device can include a short pulse detection technique and a long pulse detection technique that can be performed using multiple chains in the WLAN device. A receive chain in a WLAN receiver can include an antenna and associated receiver components for processing an incoming signal. Short pulse detection is particularly effective when the incoming signal includes one or a limited number of main pulses and some residual pulses. In contrast, long pulse detection is particularly effective when the incoming signal is longer, thereby allowing various characteristics of the incoming signal to be accurately measured.

The short pulse detection technique can include detecting an increase of power in any chain of the WLAN receiver. After detecting an increase in power, the in-band and maximum power of the incoming signal can be measured on all chains. Based on the measured in-band and maximum power, the WLAN device can adjust the gain on all chains. With each gain adjustment, the current gain setting becomes closer to an amount of gain needed to properly size the incoming signal. However, if the signal is extremely short, perhaps only one gain adjustment can be made.

In one embodiment, a pulse is detected if (1) at least one of the signals on the multiple chains is an in-band signal, (2) the maximum power of the strongest chain is greater than a radar pulse threshold, and, after the gain has been properly adjusted, (3) at some later time, the maximum power of the strongest chain is less than a low predetermined threshold (thereby verifying that the pulse has ended). If no pulse is detected, then the incoming signal can be processed normally (i.e. as a WLAN communication).

If a pulse is detected, then the short pulse detection technique can include determining whether the incoming signal appears to contain a non-radar communication consistent with the type of communication a WLAN device expects to receive during normal operation. If a non-radar signal cannot be found, then a radar event (or error) can be asserted. The radar event can be characterized as having a length of zero because the pulse was too short to make a measurement. If a non-radar signal is found, then fine gain adjustments can be made in the chains. At this point, the physical layer of the incoming signal can be tested. If an error occurs in physical layer testing, thereby indicating that the incoming signal is not a normal WLAN communication, then a radar event of length zero can once again be asserted. Otherwise, the incoming signal can be processed as a normal WLAN packet. After asserting a radar event or normal processing of the packet, the short pulse detection technique can wait for the next power increase.

The long pulse detection technique can include comparing a maximum received signal strength indicator (RSSI) to a predetermined threshold. The maximum RSSI can be obtained by registering the RSSI on each chain and then determining the largest registered RSSI. If the maximum RSSI exceeds the threshold, then a counter can be initialized and started. If the signal power of the strongest chain subsequently drops significantly, then the counter can be stopped. At this point, the value stored by the counter indicates a length of the incoming signal, i.e. a burst duration.

A non-packet event (e.g. any error associated with or exception to a standard 802.11 packet) combined with a large power drop can advantageously indicate a radar signal. Therefore, if a non-packet event is detected after the power drop is detected, then a radar event with a length equivalent to the counter value can be asserted. If no non-packet event occurs, which indicates a valid WLAN communication, then the incoming signal can be processed normally.

If no power drop occurs and no non-packet events occur, then a WLAN signal is being received and the incoming signal can be processed normally. In contrast, if no power drop occurs, but a non-packet event occurs, then a radar signal is most likely being received. At this point, a delay can be initiated. The delay ensures that an opportunity exists to detect a power drop in the radar signal even if a very long radar signal is being received.

During the delay, if a drop in power of the strongest chain is detected, then a radar event with a length equivalent to the counter value can be asserted. If no drop in power of the strongest chain is detected, then a time out of the delay period can be initiated and a radar event with a default length N can be asserted. In one embodiment, the default length N can be a length greater than the identification codes used for any of the known radar signals.

Portions of both the device and method can be implemented in programming on a general purpose computer or networked computers. In addition, any steps implemented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s).

DETAILED DESCRIPTION OF THE FIGURES

A wireless local area network (WLAN) device is required to avoid using the frequencies used by any radar source. Therefore, a WLAN device must have the capability to detect and distinguish radar signals from other traffic (or interference) that may also be present in the frequency band used by the WLAN device.

Figure 1:
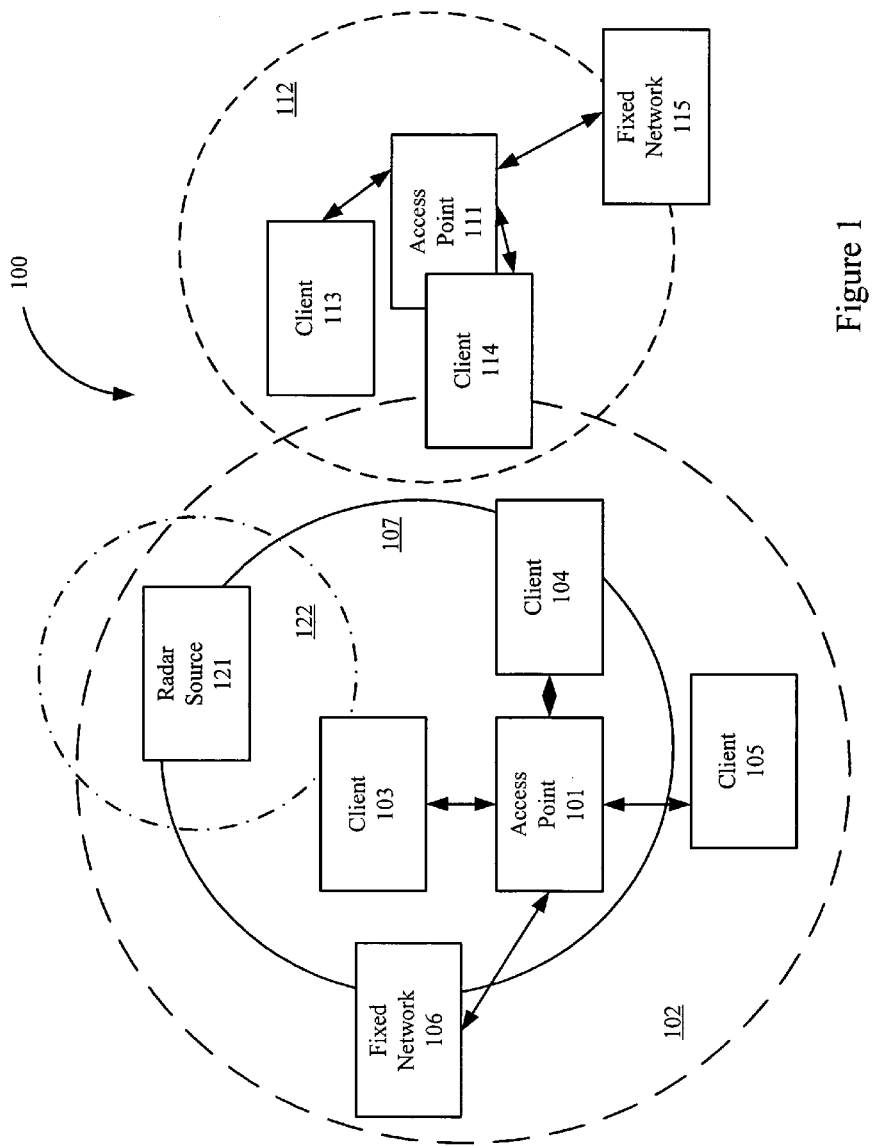
FIG. 1 illustrates an exemplary wireless network including multiple access points and a radar source having overlapping coverage areas.

FIG. 1 illustrates an exemplary wireless network 100 that includes two access points 101 and 111 having coverage areas 102 and 112, respectively, as well as a radar source 121 having a coverage area 122. In network 100, clients communicate with each other via their respective access points. Thus, access point 101 can function as a communication hub between its associated clients 103–104 and access point 111 can function as a communication hub between its associated clients 113–114. A client in coverage area 102 can communicate with a client in coverage area 112 via access point 101, which in turn can communicate with access point 111. Because a client can be a mobile device and each access point has a predetermined coverage area, a client may associate with an access point for a first time period and then associate with another access point for a second time period.

Note that access points 101 and 111 can also provide access to fixed networks 106 and 115, respectively. These fixed networks may be the same network (e.g. an Ethernet LAN or an IEEE 1394 network) or different networks. In some embodiments, fixed networks 106 and 115 may be coupled via a WAN, such as the Internet or some other communications link, to allow coordination between coverage areas 102 and 112.

In network 100, coverage areas 102 and 112 are shown to overlap, thereby indicating the possibility of interference between the WLAN devices (i.e. the clients and/or access points) within those coverage areas. Access points 101 and 111 can use digital frequency selection (DFS) to control their operating frequencies, thereby minimizing interference despite the overlapping coverage areas.

In network 100, coverage area 122 of radar source also overlaps coverage area 102 of access point 101. This overlap indicates the possibility of potential WLAN traffic interference with radar signals to/from radar source 121. Note that radar source 121 could be a fixed radar source (e.g. a radar transmitter) or a mobile radar source (e.g. a weather radar installed in an airplane). Therefore, the overlap between coverage areas 122 and 102 (and/or the overlap between coverage areas 122 and 112) could change over time.

In one embodiment, a WLAN device can listen for WLAN data packets as well as other signals during its normal operation. Upon detecting an "event" (i.e. some signal), the WLAN device can analyze that signal to determine whether it is a regular WLAN packet. In one embodiment, the WLAN device can also detect various types of unrecognized events, e.g. noise fluctuations, collisions between WLAN stations or hidden nodes, co-channel interference, and other non-LAN wireless traffic (cordless phone transmissions, etc.).

In accordance with one embodiment of WLAN network 100, one or more WLAN devices can include a radar detection and avoidance system that enables detection of radar signals as well as identification of the radar source. Note that the term "radar" or "radar signal" refers to any signal in the operating frequency band of the WLAN device that has priority in that frequency band. Upon initialization, a WLAN device can test for radar signals in a given channel and, if detected, switch channels until a radar-free channel is found. Note that some radiolocation systems have bandwidth greater than a WLAN signal. Therefore, in some embodiments, the WLAN device can also test neighboring channels for radar. In yet other embodiments, the access point can require that all neighboring channels be free of radar signals.

During normal operation of the WLAN device, events indicating a radar event (e.g. a mobile radar entering a coverage area of the WLAN network) can be detected. At this point, continued operation of the WLAN network can be moved to a radar-free channel. As part of the move from one WLAN operating frequency to another, access point 101 may direct associated clients (e.g. clients 103, 104, and 105)

to change their operating frequency. In one embodiment, each client (which also has its own coverage area (e.g. see client 103 and its associated coverage area 107)) can also be configured (i.e. in addition to the access points) to detect radar events and initiate channel movement so as to not interfere with the radar. Therefore, the term "WLAN device" can include an access point or a client in a WLAN network.

In accordance with one feature of the invention, a receiver or a receiver portion of a transceiver in the WLAN device can quickly and accurately evaluate incoming signals to detect whether the received signal is radar. If the received signal is radar, then the characteristics of the received signal can be used to determine whether the radar has priority in one or more channels. For example, the receiver can determine radar priority for channels currently being used by the wireless device as well as channels intended to be used by the wireless device. Alternatively, the receiver can also function as a scanning device to determine an amount or character of radar traffic in a particular airspace.

Figure 2:
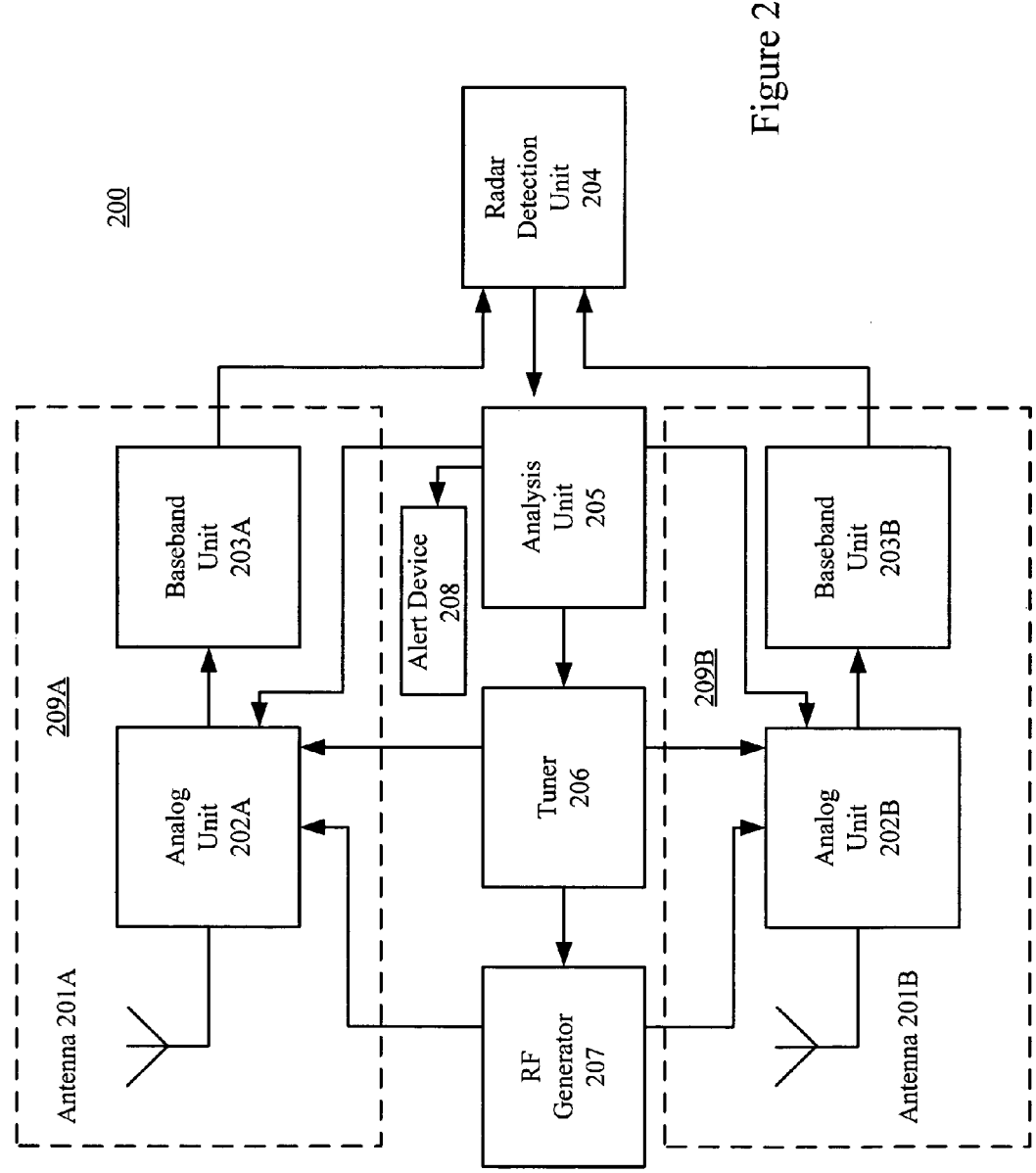
FIG. 2 illustrates a portion of a simplified transceiver that can use multiple antennas for the detection of radar.

To provide this quick and accurate radar detection, a WLAN receiver can use multiple antennas during signal reception. FIG. 2 illustrates a portion of a simplified transceiver 200 that can use multiple antennas for the detection of radar. In this embodiment, transceiver 200 includes two receive "chains" 209A and 209B (hereinafter called chains) that have substantially similar components. Therefore, for simplicity, such components will be referenced numerically without chain designation, e.g. analog unit 205 will refer to either of analog units 205A and 205B.

Each chain 209 includes at least one antenna 201 that receives an incoming RF signal, an analog unit 202 that converts that RF signal to a baseband signal, and a baseband unit 203 that converts the baseband signal to a digital signal. Note that analog unit 202 and baseband unit 203 can include components currently used for receiving network traffic from other WLAN devices. U.S. patent application Ser. No. 09/849,442, entitled In-Band and Out-Of-Band Signal Detection For Automatic Gain Calibration Systems", filed by Atheros Communications, Inc. on May 4, 2001 and incorporated by reference herein, describes exemplary components that may be provided in analog unit 202 and baseband unit 203. For example, both analog unit 202 and baseband unit 203 can include amplifiers for amplifying the signal, thereby facilitating signal analysis.

Notably, a radar detection unit 204 receives the digital signals from all chains 209 (e.g. chains 209A and 209B) and jointly processes the data to detect any possible incoming radar signals. In one embodiment, radar detection unit 204 can form part of a system that can identify other classes of signals (e.g. IEEE 802.11a/802.11b/802.11g packets). U.S. patent application Ser. No. 10/698,666, entitled "Voting Block For Identifying WLAN Signal Modulation Type", filed by Atheros Communications, Inc. on Oct. 31, 2003, describes one such system.

Various organizations promulgate specific radar signals that a wireless device must avoid in order to be granted a license to operate in various portions of the frequency spectrum. For example, Table 1 provides an exemplary listing of characteristics of European Telecommunications Standards Institute (ETSI) identified radar signals. In Table 1, a burst duration refers to a beam width divided by a scan rate, pulses per burst refers to a pulse rate multiplied by a burst duration, and a burst period refers to 360 divided by the scan rate. The abbreviation "Air" stands for Airborne, "M" stands for Meteorological, "REI" stands for Research & Earth Imaging, "RI" stands for Radio-Navigation Instrumentation, "RS" stands for Radio-Navigation Surface & Air Search, "Gr" stands for Ground, "Se" stands for Search, "Sh" stands for Ship, "Cont" stands for Continuous, and "Conv" stands for Conventional.

TABLE 1

ETSI-Identified Radar Signals

| Radar Type | Scan Type | Pulse Repetition Rate [pps] | Beam Width [°] | Scan rate [°/s] | Burst Duration [s] | Pulses per burst | Burst Period [s] | Pulse Width (μs) | Pulse Rise & Fall Times (μs) | Modulation |
|---|---|---|---|---|---|---|---|---|---|---|
| A-M, Gr/S | 360° | 50 | 0.65 | 0.65 | 1.0000 | 50 | 553.85 | 2 | 0.2 | N/A |
| A-M, Gr/Sh | 360° | 250 | 0.65 | 0.65 | 1.0000 | 250 | 553.85 | 2 | 0.2 | N/A |
| A-M, Gr/Sh | 360° | 1200 | 0.65 | 0.65 | 1.0000 | 1200 | 553.85 | 2 | 0.2 | N/A |
| C-M, Gr | 360° | 4000 | 0.95 | 0.00 | Cont. | Cont. | N/A | 0.05–18 | 0.005 | N/A |
| C-M, Gr | 360° | 4000 | 0.95 | 36.00 | 0.0264 | 106 | 10.00 | 0.05–18 | 0.005 | N/A |
| E-M, Gr | 360° cont. & sector | 2000 | 0.55 | 21.00 | 0.0262 | 52 | 17.14 | 1.1 | 0.11 | N/A |
| E-M, Gr | 360° cont. & sector | 2000 | 0.55 | 24.00 | 0.0229 | 46 | 15.00 | 1.1 | 0.11 | N/A |
| E-M, Gr | 360° cont. & sector | 2000 | 0.4 | 21.00 | 0.0190 | 38 | 17.14 | 1.1 | 0.11 | N/A |
| E-M, Gr | 360° cont. & sector | 2000 | 0.4 | 24.00 | 0.0167 | 33 | 15.00 | 1.1 | 0.11 | N/A |

TABLE 1-continued

ETSI-Identified Radar Signals

| Radar Type | Scan Type | Pulse Repetition Rate [pps] | Beam Width [°] | Scan rate [°/s] | Burst Duration [s] | Pulses per burst | Burst Period [s] | Pulse Width (μs) | Pulse Rise & Fall Times (μs) | Modulation |
|---|---|---|---|---|---|---|---|---|---|---|
| F-M, Gr | 360° | 250 | 1 | 30.00 | 0.0333 | 8 | 12.00 | 0.8–2.0 | 0.08 | N/A |
| F-M, Gr | 360° | 1180 | 1 | 30.00 | 0.0333 | 39 | 12.00 | 0.8–2.0 | 0.08 | N/A |
| F-M, Gr | 360° | 250 | 1 | 48.00 | 0.0208 | 5 | 7.50 | 0.8–2.0 | 0.08 | N/A |
| F-M, Gr | 360° | 1180 | 1 | 48.00 | 0.0208 | 25 | 7.50 | 0.8–2.0 | 0.08 | N/A |
| F-M, Gr | 360° | 250 | 0.5 | 30.00 | 0.0167 | 4 | 12.00 | 0.8–2.0 | 0.08 | N/A |
| F-M, Gr | 360° | 1180 | 0.5 | 30.00 | 0.0167 | 20 | 12.00 | 0.8–2.0 | 0.08 | N/A |
| F-M, Gr | 360° | 250 | 0.5 | 48.00 | 0.0104 | 3 | 7.50 | 0.8–2.0 | 0.08 | N/A |
| F-M, Gr | 360° | 1180 | 0.5 | 48.00 | 0.0104 | 12 | 7.50 | 0.8–2.0 | 0.08 | N/A |
| G-M, Gr | 360° | 259 | 1.65 | 30.00 | 0.0550 | 14 | 12.00 | 3.0 | 0.3 | N/A |
| G-M, Gr | 360° | 259 | 1.65 | 48.00 | 0.0344 | 9 | 7.50 | 3.0 | 0.3 | N/A |
| H-M, Gr | 360° | 250 | 0.5 | 6.00 | 0.0833 | 21 | 60.00 | 0.8–5.0 | 0.2–2 | Conv. |
| H-M, Gr | 360° | 1200 | 0.5 | 6.00 | 0.0833 | 100 | 60.00 | 0.8–5.0 | 0.2–2 | Conv. |
| H-M, Gr | 360° | 250 | 0.5 | 18.00 | 0.0278 | 7 | 20.00 | 0.8–5.0 | 0.2–2 | Conv. |
| H-M, Gr | 360° | 1200 | 0.5 | 18.00 | 0.0278 | 33 | 20.00 | 0.8–5.0 | 0.2–2 | Conv. |
| H-M, Gr | 360° | 250 | 2 | 6.00 | 0.3333 | 83 | 60.00 | 0.8–5.0 | 0.2–2 | Conv. |
| H-M, Gr | 360° | 1200 | 2 | 6.00 | 0.3333 | 400 | 60.00 | 0.8–5.0 | 0.2–2 | Conv. |
| H-M, Gr | 360° | 250 | 2 | 18.00 | 0.1111 | 28 | 20.00 | 0.8–5.0 | 0.2–2 | Conv. |
| H-M, Gr | 360° | 1200 | 2 | 18.00 | 0.1111 | 133 | 20.00 | 0.8–5.0 | 0.2–2 | Conv. |
| I-M, Gr | 360° | 50 | 0.5 | 6.00 | 0.0833 | 4 | 60.00 | 0.8–5.0 | 0.2–2 | w/ doppler capability |
| I-M, Gr | 360° | 1200 | 0.5 | 6.00 | 0.0833 | 100 | 60.00 | 0.8–5.0 | 0.2–2 | w/ doppler capability |
| I-M, Gr | 360° | 50 | 0.5 | 18.00 | 0.0278 | 1 | 20.00 | 0.8–5.0 | 0.2–2 | w/ doppler capability |
| I-M, Gr | 360° | 1200 | 0.5 | 18.00 | 0.0278 | 33 | 20.00 | 0.8–5.0 | 0.2–2 | w/ doppler capability |
| I-M, Gr | 360° | 50 | 2 | 6.00 | 0.3333 | 17 | 60.00 | 0.8–5.0 | 0.2–2 | w/ doppler capability |
| I-M, Gr | 360° | 1200 | 2 | 6.00 | 0.3333 | 400 | 60.00 | 0.8–5.0 | 0.2–2 | w/ doppler capability |
| I-M, Gr | 360° | 50 | 2 | 18.00 | 0.1111 | 6 | 20.00 | 0.8–5.0 | 0.2–2 | w/ doppler capability |
| I-M Gr | 360° | 1200 | 2 | 18.00 | 0.1111 | 133 | 20.00 | 0.8–5.0 | 0.2–2 | w/ doppler capability |

TABLE 1-continued

ETSI-Identified Radar Signals

| Radar Type | Scan Type | Pulse Repetition Rate [pps] | Beam Width [°] | Scan rate [°/s] | Burst Duration [s] | Pulses per burst | Burst Period [s] | Pulse Width (µs) | Pulse Rise & Fall Times (µs) | Modulation |
|---|---|---|---|---|---|---|---|---|---|---|
| J-M, Gr | 360° | 100 k | 1.5 | 1.20 | 1.2500 | 125000 | 300.00 | 0.1 | 0.005 | w/ doppler capability |
| J-M, Gr | 360° | 100 k | 12 | 1.20 | 10.0000 | ##### | 300.00 | 0.1 | 0.005 | w/ doppler capability |
| K-RI, Gr | Tracking | 3000 | 2.5 | N/A | Cont. | N/A | N/A | 1.0 | 0.1/0.2 | N/A |
| L-RI, Gr | Tracking | 160–640 | 0.4 | N/A | Cont. | N/A | N/A | 0.25, 1.0, 5.0 | 0.02–0.5 | None |
| M-RI, Gr | Tracking | 160–640 | 0.8 | N/A | Cont. | N/A | N/A | 0.25, 0.5, 1.0 | 0.02–0.5 | None |
| N-RI, Gr | Tracking | 20–1280 | 1 | N/A | Cont. | N/A | N/A | 0.25–1.0 plain, 3.1–50 chirp | 0.02–0.1 | Pulse/ chirp pulse |
| O-RI, Gr | Tracking | 320 | 1 | N/A | Cont. | N/A | N/A | 100 | 0.5 | Chirp pulse |
| P-RS, Sh | 360° | 500 | 2.6 | 36.00 | 0.0722 | 36 | 10.00 | 20 | 0.5 | Linear FM |
| P-RS, Sh | 360° | 500 | 2.6 | 72.00 | 0.0361 | 18 | 5.00 | 20 | 0.5 | Linear FM |
| Q-RS, Sh | 30° Sector | 2400 | 1.6 | 90.00 | 0.0178 | 43 | 0.33 | 0.1/ 0.25/ 1.0 | 0.03/ 0.05/ 0.1 | None |
| Q-RS, Sh | 30° Sector | 1200 | 1.6 | 90.00 | 0.0178 | 21 | 0.33 | 0.1/ 0.25/ 1.0 | 0.03/ 0.05/ 0.1 | None |
| Q-RS, Sh | 30° Sector | 750 | 1.6 | 90.00 | 0.0178 | 13 | 0.33 | 0.1/ 0.25/ 1.0 | 0.03/ 0.05/ 0.1 | None |
| Q-RS, Sh | 270° Sector | 2400 | 1.6 | 90.00 | 0.0178 | 43 | 3.00 | 0.1/ 0.25/ 1.0 | 0.03/ 0.05/ 0.1 | None |
| Q-RS, Sh | 270° Sector | 1200 | 1.6 | 90.00 | 0.0178 | 21 | 3.00 | 0.1/ 0.25/ 1.0 | 0.03/ 0.05/ 0.1 | None |
| Q-RS, Sh | 270° Sector | 750 | 1.6 | 90.00 | 0.0178 | 13 | 3.00 | 0.1/ 0.25/ 1.0 | 0.03/ 0.05/ 0.1 | None |
| R-REI | Fixed L or R of flight path | 1000–4000 | 3 | N/A | Cont. | N/A | N/A | 7 or 8 | 0.5 | Non-Linear/ Linear FM |
| S-Se, Air | Cont. | 200 | 2 | 20.00 | 0.1000 | 20 | 18.00 | 1 | 0.05 | CW Pulse |
| S-Se, Air | Cont. | 1500 | 2 | 20.00 | 0.1000 | 150 | 18.00 | 1 | 0.05 | CW Pulse |
| S-Se, Air | Cont. | 200 | 4 | 20.00 | 0.2000 | 40 | 18.00 | 1 | 0.05 | CW Pulse |
| S-Se, Air | Cont. | 1500 | 4 | 20.00 | 0.2000 | 300 | 18.00 | 1 | 0.05 | CW Pulse |

In accordance with one aspect of the invention, radar detection unit 204 can use one or more characteristics of radar types (such as those listed in Table 1) to identify possible radar signals. If possible radar signals are detected, then radar detection unit 204 can forward values of such characteristics to an analysis unit 205. In one embodiment, if the values of such characteristics cannot be affirmatively determined, then radar detection unit 204 can generate estimates of such characteristics and forward those estimates to analysis unit 205.

Analysis unit 205 can include programming and/or logic to identify (or at least estimate), the radar type. After such identification/estimation, analysis unit 205 can inform a tuner 206 to change the RF frequency as necessary. Tuner 206 can then send the new operating frequency to analog units 202, thereby changing the operating frequency of transceiver 200. Note that when transceiver 200 is transmitting, RF generator 207 generates RF signals (e.g. mixing an RF carrier frequency provided by tuner 206 with data packets) and forwards these RF signals to analog unit 202 for power amplification before broadcasting on antennas 201.

In one embodiment, analysis unit 205 can also send a control signal to an alert device 208. In one embodiment, alert device 208 can produce an audio warning signal to an operator (e.g. "Radar Warning"). In another embodiment, alert device 208 can send a visual message that is interpreted and displayed on a screen (e.g. a sweep radar style screen that identifies radar sources). In yet another embodiment, a message (e.g. containing data about the detected radar) can be sent to a database program that maintains a record of the traffic detected.

Figure 3:
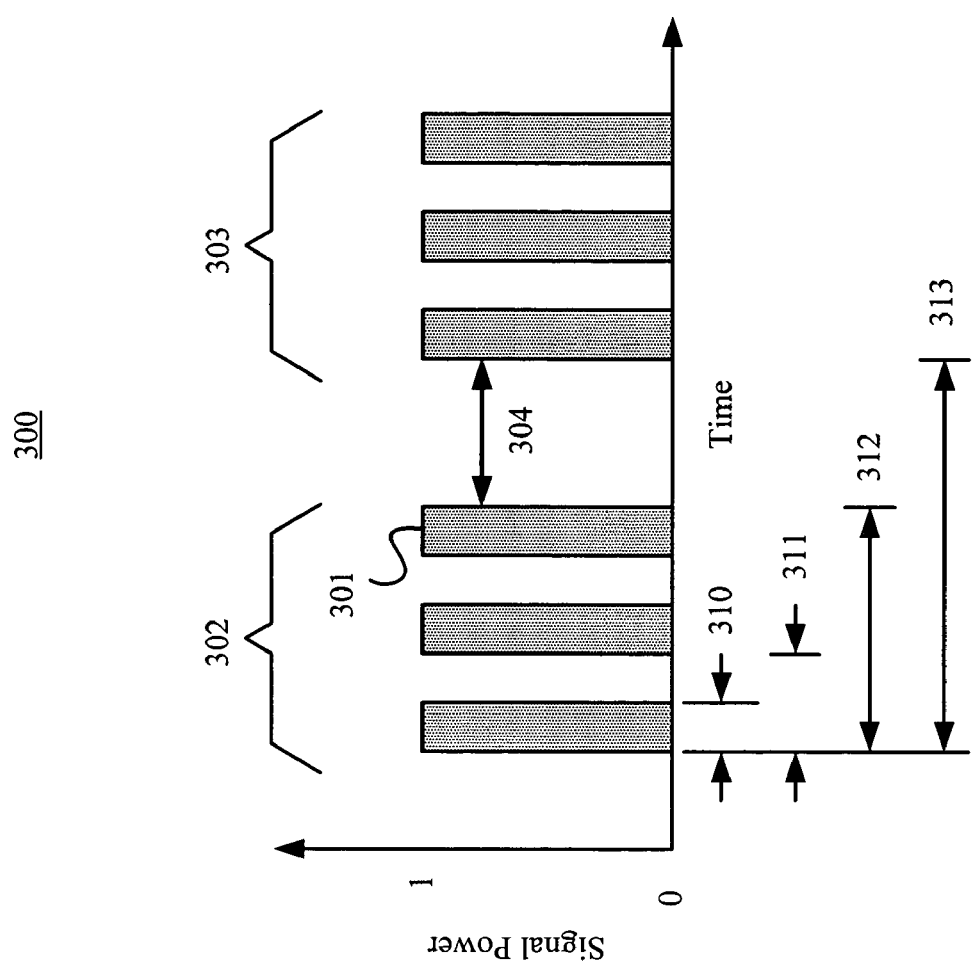
FIG. 3 illustrates an exemplary radar signal that could be transmitted in the same frequency spectrum as a wireless network and/or WLAN devices of the wireless network.

FIG. 3 illustrates an exemplary radar signal 300 that could be transmitted in the same frequency spectrum as a wireless network and/or WLAN devices in a wireless network. In this case, radar signal 300 includes a series of pulses 301, transmitted in a series of bursts, e.g. first burst 302 and second burst 303. Bursts 302 and 303 are separated by a gap 304.

Each radar signal pulse 301 is a high-frequency (approximately 5 GHz) wave (e.g. sine wave, square wave, etc.), having a pulse width 310 of approximately one microsecond to five microseconds. A pulse period 311 is the time between the start of consecutive pulses and is the inverse of a pulse repetition frequency (PRF) of the signal. A typical pulse period is on the order of one millisecond. A burst duration 312 refers to the time duration associated with the burst of pulses (or, alternatively, the number of pulses in a burst). A burst period 313 is the time from the start of one burst (e.g. burst 302) to the start of the next consecutive burst (e.g. burst 303), and is on the order of 1–10 seconds. Note that Table 1 lists exemplary values for pulse widths, burst lengths, and burst periods of different radar types.

As can be seen in FIG. 3, a radar signal can possess a degree of periodicity with respect to pulses and bursts. Transceiver 200 (FIG. 2) can measure characteristics associated with this periodicity to differentiate noise and other types of anomalous (non-WLAN traffic) events from radar signals. Although noise may interfere and cause adverse effects on WLAN traffic, the WLAN device need not be configured to strictly change channels when encountering noise. In contrast, the WLAN device must be configured to change channels when encountering radar that has priority for that channel.

Analysis unit 205 can match patterns using pulse characteristics, burst characteristics, and/or other characteristics (e.g. one or more of those characteristics listed in Table 1) to identify, within a certain degree of specificity, the identity of the radar source. In one embodiment, analysis unit 205 can use look-up tables or profile data provided by system operators. In another embodiment, analysis unit 205 could be configured to classify any type of periodic event as a radar signal without specific identification. Note that noise having radar-like characteristics may trigger a false detect. However, this type of noise would occur only rarely in normal operation.

One of the challenges of distinguishing radar signals from other traffic is that radar signals can be on the order of fractions of a micro-second in duration, which is a very short time frame to acquire and determine signal characteristics. To more accurately acquire such signal characteristics (for both WLAN and non-WLAN signals), various amplifiers in analog unit 202 and baseband unit 203 can size the incoming signal. A gain control device, such as an Automatic Gain Control (AGC) device, is typically utilized to size the incoming signal. This AGC can form part of analog units 202A and 202B (FIG. 2).

Cost effective AGCs can be produced having approximately 60 dB of operating range. However, there can be a fairly large difference in signal strengths between WLAN signals (and/or noise) and radar signals. Specifically, the radar signals are typically much stronger than the WLAN signals. Therefore, if a radar signal is received, the AGC may have a significant amount of gain re-calibration (i.e. gain change) to perform before effectively sizing the incoming signal. Unfortunately, there is a time penalty for making AGC gain adjustments. Thus, considering the short length of time that the radar pulses are being received, by the time the gain would have been adjusted properly the signal is often gone.

Therefore, in one embodiment, radar detection unit 204 can divide the task of radar detection into two parts: short pulse detection and long pulse detection. These detection techniques will now be discussed in further detail. In short pulse detection, a pulse detection mechanism can be provided for measuring and reporting an incoming signal that is shorter than the period needed by the AGC to properly size the incoming signal (e.g. a few micro seconds).

Figure 4:
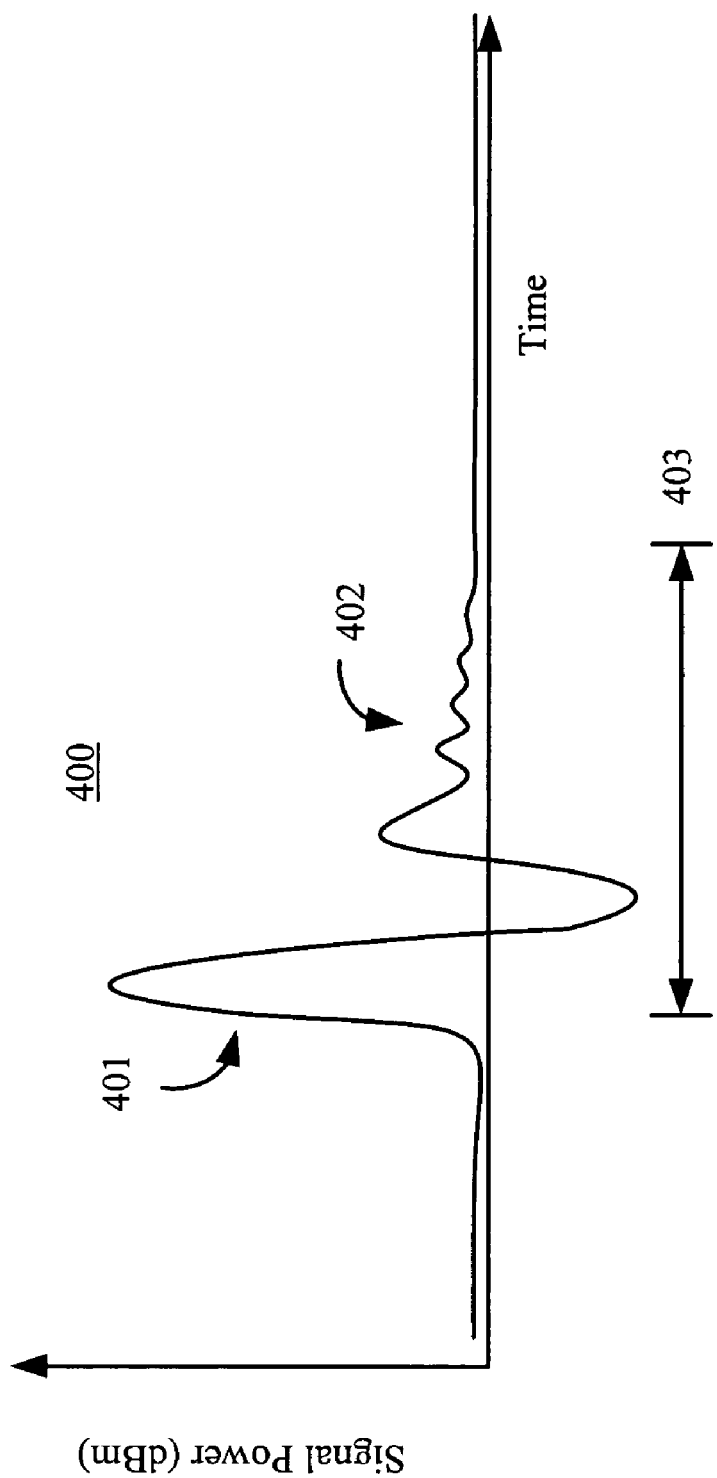
FIG. 4 illustrates a graph that plots the power of an exemplary short signal over time.

FIG. 4 illustrates a graph that plots the power of an exemplary short signal 400 over time. In this case, signal 400 includes a set of one or more main pulses (e.g. main pulse 401) and some residual signals 402. Thus, signal 400 may appear as a very limited number of pulses or even as a single pulse. An amount of time required to make final gain adjustments, thereby properly sizing the signal, is illustrated as period 403. As shown in FIG. 4, by the end of period 403, signal 400 has completed, thereby effectively leaving no signal for measurement to make further gain adjustment.

Although a final gain adjustment is not accomplished in the case of signal 400 during period 403, a number of intermediate gain adjustments can be accomplished. Each of these intermediate adjustments and subsequent gathered data regarding the incoming signal during period 403 can be used in estimating whether signal 400 is radar. Good estimates can be achieved if the incoming signal lasts long enough for the AGC to make as few as 2 or 3 gain adjustments.

Figure 5:
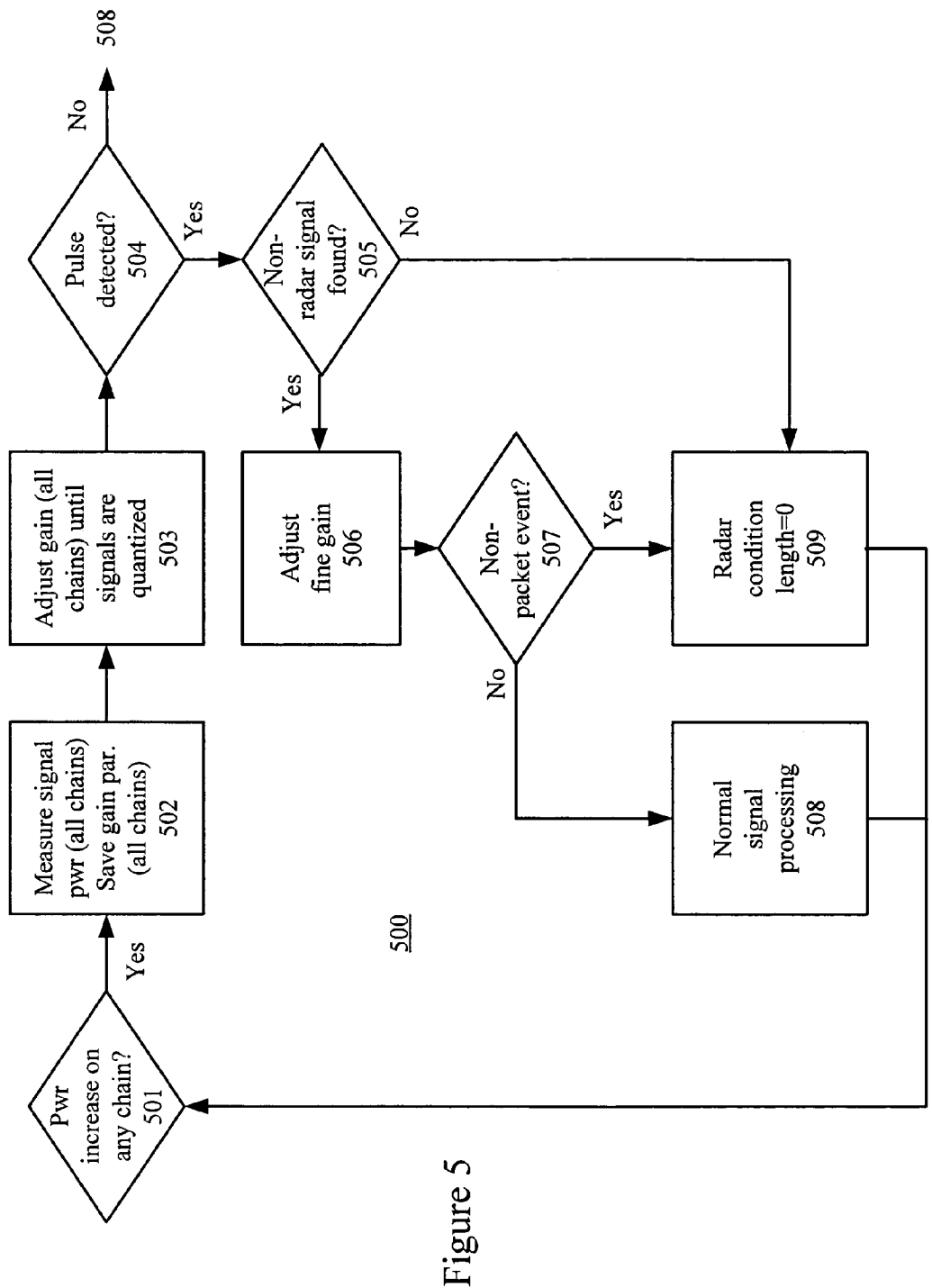
FIG. 5 illustrates a flow chart of a short pulse detection technique.

FIG. 5 illustrates a flow chart of a short pulse detection technique 500. In this embodiment, a coarse gain drop on any of the chains (e.g. measured at the AGC) can advantageously indicate that an incoming signal is potentially a radar event. Therefore, in step 501, the incoming signal can be monitored, directly or indirectly, for an increase in power on any of the chains. In one embodiment, an increase of power can be detected when the incoming signal goes out of range of typical WLAN signals. For example, average WLAN signals may be measured to determine a predetermined range of signal strengths and/or signal power. If the incoming signal exceeds that range, then a coarse gain drop could be triggered.

In another embodiment, a normally operating WLAN device that encounters a predetermined power increase could trigger a coarse gain drop. For example, small changes in power due to random noise fluctuation could be tolerated, but exceeding a power increase threshold (e.g. 10–15 dB) could trigger the coarse gain drop.

Note that signal power (also called signal strength in the industry) can be used individually or in combination with gain adjustment to trigger the course gain drop. For example, in one embodiment, the trigger could be an increase in quantized power at the ADCs detected at the same time as a drop in gain. In one embodiment, the range of signal power and/or amount of dB gain drop in the ADC can be user- or manufacturer-programmable.

After detecting the increase in power on any chain, the in-band power (which can determine if the signal was in-band) and maximum power of the incoming signal can be measured on all chains in step 502. Any recommended change in gain based on the measured in-band power can be saved in step 503. Notably, the in-band power can be measured before the gain is adjusted, thereby ensuring that the signal is not lost (i.e. for a short signal) while the gain change is being made.

In other words, even if a coarse gain drop is recommended based on the results from step 501, process 500 waits for the signal to go through FIRs or other components that measure power in step 502 to determine if the same samples causing the initial coarse gain drop determination are in-band or out-of-band. Note that because of clipping at the ADC, the measured in-band power in step 502 may not be exact. However, sufficient data is typically available to at least estimate whether the signal was in-band or out-of-band.

Based on the measured in-band power and maximum power (e.g. as measured by radar detection unit 204), step 503 can then adjust the gain on all chains (e.g. as performed by analysis unit 205 and analog units 202A and 202B). Note that with each gain adjustment the current gain setting becomes closer to an amount of gain needed to properly size the incoming signal. Thus, if the signal is extremely short, perhaps only one gain adjustment can be made. In one embodiment, gain adjustment can be performed for each chain in step 503 based on its in- band/maximum power and recommended gain provided by step 502. Once the signal is gone, the gains can immediately be adjusted back to a level that is properly quantized (sized) for ambient noise in the band being received.

In accordance with one feature of the invention, step 504 (e.g. implemented using analysis unit 205) can use the in-band/maximum power and the recommended gain to determine if the incoming signal is a pulse. In one embodiment, a pulse is detected if (1) at least one of the signals on the multiple chains is an in-band signal, (2) the maximum power of the strongest chain is greater than a radar pulse threshold, and, after the gain has been properly quantized, (3) the maximum power of the strongest chain is less than a low predetermined threshold (thereby verifying that the pulse has ended).

If no pulse is detected in step 504, then the in coming signal can be processed normally (i.e. as a WLAN communication) in step 508 without asserting any radar events. This processing typically includes correlation and physical level tests, which are known in the art of WLAN devices and therefore are not explained in detail herein. If a pulse is detected, then step 505 determines whether the received signal appears to contain a non-radar communication consistent with the type of communication a WLAN device expects to receive during normal operation. In one embodiment, the criteria for this determination can be weighted to favor of finding a non-radar signal, thereby minimizing delay in decoding normal WLAN communications.

If a non-radar signal cannot be found in step 505, then step 509 can assert a radar event (or error) with a length of zero because the pulse was too short to make a measurement. If a non-radar signal is found in step 505, then fine gain adjustments can be made in step 506. At this, point, step 507 can then determine whether a non-packet event occurs. Note that a non-packet event results in accessing software that handles exceptions, wherein radar is a type of exception requiring a specific response. Other exceptions could include a missed packet, insufficient time to process a preamble of a packet, too much noise is present, and/or a CRC error. If a non-packet event occurs, thereby indicating that the signal is not a normal WLAN communication, then step 509 can once again assert a radar event of length zero. Otherwise, normal signal processing can proceed in step 508. After asserting a radar event or normal signal processing of the packet (either of which can be indicated to analysis unit 205), technique 500 can return to step 501 and wait for a next power increase.

In one embodiment, the number of gain adjustments as performed by step 503 and/or step 506 can also be forwarded to analysis unit 205. Specifically, gain adjustment counting can be used as evidence to help analysis unit 205 make a decision on whether to confirm a radar event, thereby resulting in changing the operating frequency of the transceiver.

Exemplary pseudo code for implementing pulse detection technique 500 immediately follows herein.

```
Detect coarse_gain_drop(detect gain drop across all chains);
Delay long enough to measure firpwr16(i), where (i) is the chain index;
pulse_in_band=any(firpwr16(i)+const > adcpwr16(i));
record pulse_base_gain(i)=total_gain(i);
change gain normally(across all chains);
measure largest total gain drop from pulse_base_gain;
when signal_in_range
pulse_detected=
    (pulse_in_band(on any chain) & . . .
    (pulse_max_height(strongest chain)> thresh) & . . .
    (rssi(stongest chain)< pulse_rssi));
signal_found =(flag_relpwr & (~enable_thr1a | rssi(com-
    bined)> thr1a));
if pulse_detected
    if signal_found
        assert agc_done after fine gain change(s);
        if non-packet event
            assert radar_event, length=0;
        else
            proceed normal signal processing;
        end
    else
        assert radar_event, length 0 immediately;
    end
else
    proceed normally;
end
end
```

In this pseudo code, "firpwr16(i)" refers to measured powers of the received signals for each chain (i) after band filtering (through FIR filters); "const" refers to an amount of signal power that accounts for in-band losses due to out-of-band signal filtering (e.g. FIR filtering); "adcpwr16(i)" refers to signal powers measured from the ADCs for each chain (i) without band filtering; "pulse_base gain(i)" refers to the AGC gain setting for each chain (i) upon initial receipt of a pulse; "total_gain(i)" refers to the amount of gain for each chain (i) used by the AGC; "signal_in_range" refers to the AGC being properly quantized for the currently incoming signal (whether one or more of a radar, 802.11a preamble/packet, or ambient noise); "pulse_in_band(i)" refers to whether the received signal from each chain (i) was in band or out of band (in band being the channel being monitored/used); "pulse_max_height(i)" refers to the largest measured power (or signal strength) of an incoming signal for chains (i) (measured as pulse_base_gain(i)–min gain_used(i), wherein min_gain_used(i) is the smallest amount of total gain used on chain (i) in the system since pulse_base_gain was measured); "thresh" refers to a predetermined value (i.e. a threshold) for a minimum radar signal (e.g. signal strength or measured power); "rssi (i)" refers to a received signal strength indicator on chain (i); "combined rssi" refers to the sum of the RSSIs on all chains; "pulse_rssi" refers to a maximum threshold for RSSI (note that the RSSI must be under this value to allow it to be called a pulse (if other conditions are also true)); "flag relpwr" refers to a status indication of strong signal detection (e.g. in-band FIR power having a value similar to ADC power); "enable_thr1a" refers to a flag that enables an RSSI threshold check; and "thr1a" refers to a signal threshold indicating a minimum amount of signal strength.

In one embodiment, one or more of the parameter values in the above pseudo code (e.g. the threshold values, etc.) can be programmable at a manufacturing stage when making the components for the WLAN device. In another embodiment, an end user of the WLAN device can program these values by using a GUI or another interface.

As previously discussed, the task of radar detection can be divided into two parts: pulse detection and long pulse detection. Short pulse detection is particularly effective when the incoming signal includes one or a limited number of main pulses and some residual pulses, e.g. short signal 400 of FIG. 4. In contrast, long pulse detection is particularly effective when the incoming signal is long enough for the gain to be accurately adjusted, thereby allowing various characteristics of the incoming signal to be accurately measured. In accordance with one embodiment of the invention, and described in further detail below in reference to FIG. 7, short pulse detection and long pulse detection can be performed in parallel or serially to provide an accurate, efficient system radar detection technique.

Figure 6:
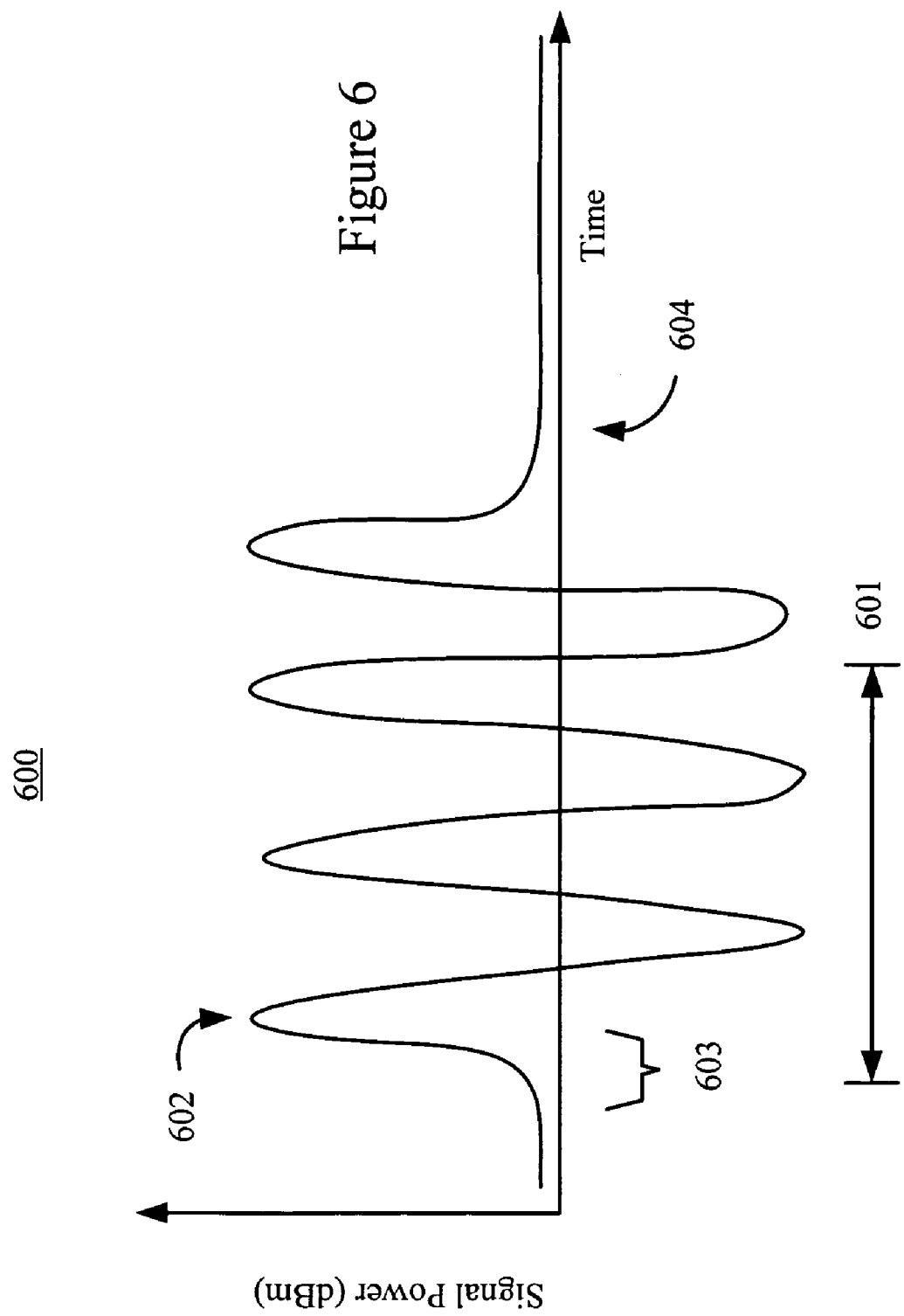
FIG. 6 illustrates a graph that plots the power of an exemplary long signal over time.

FIG. 6 illustrates a graph that plots the power of an exemplary long signal 600 over time. In this case, long signal 600 includes multiple main pulses. As shown in FIG. 6, by the end of a period 601 (an amount of time required to make final gain adjustments), long signal 600 is complete, thereby providing more than enough duration for measurements and subsequent gain adjustments based on such measurements.

In accordance with one feature of the invention, for long pulse detection, the length of the incoming signal (i.e. the burst duration) is measured. Note that referring back to Table 1, radar burst duration can vary, but is generally less than 100 microseconds. Of importance, even the longest radar lengths are still typically much shorter than the lengths of wireless LAN packets. (Note that short packets sent at high speeds could be shorter than certain radar bursts. However, in general, WLAN systems try to send large packets at high speed to increase throughput.)

In addition, regardless of length, processing a radar signal via normal WLAN processing will typically result in a non-packet event (e.g. a physical level error). This non-packet event triggers analysis unit 205 (FIG. 2) to indicate that a potential radar signal is being received. At this point, analysis unit 205 directs analog units 202A and 202B to maintain the gain at the same setting while radar detection unit 204 continues to measure the received power of the potential radar signal until the end of the radar pulse (wherein the "end" can be defined by a significant radar signal power drop, e.g. a 10 dB drop in received power). The time span between initial reception of the radar signal and the end of the radar pulse can be calculated as a burst duration, which can be analyzed by analysis unit 205. Specifically, analysis unit 205 can advantageously use this information to identify the type of radar being received.

Figure 7:
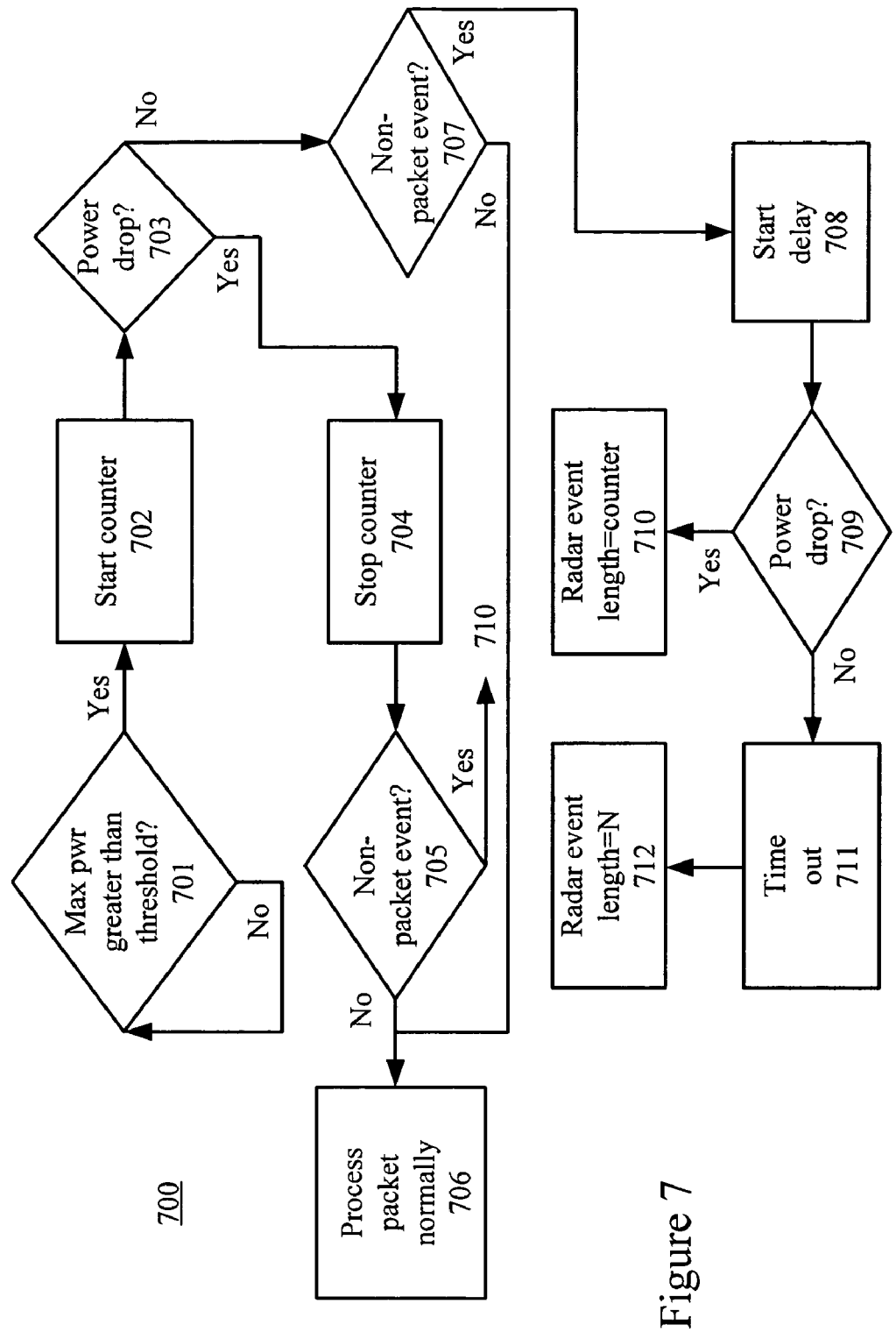
FIG. 7 illustrates a flow chart of a long pulse detection technique.

FIG. 7 illustrates a flow chart of a long pulse detection technique 700. In this embodiment, step 701 compares the maximum power of the strongest chain to a predetermined threshold. The maximum power can be obtained by registering the power, e.g. the received signal strength indicator (RSSI), on each chain during signal reception and then determining the largest registered RSSI of these RSSIs. If the maximum RSSI exceeds the threshold, then step 702 can initialize a counter.

Referring back to FIG. 6, this counter can be initialized at point 602. In one embodiment, the counter can be initialized with a count value approximately equal to an amount of time 603 that represents the time required to register the RSSI, set the counter, or other factors that need to be accounted for in a timing indicated by the counter value. In other embodiments, the counter can be initialized to zero and adjustments, if needed, are made at some point after the counter value is read.

If the signal power of the strongest chain subsequently drops significantly (e.g. 10 dB or another predetermined amount), as determined in step 703, then step 704 can stop the counter. For example, in FIG. 6, the counter could be stopped at point 604. At this point, the value stored by the counter indicates a length of the incoming signal, i.e. a burst duration.

Among other causes, non-packet events can occur because of a bad packet, packet collisions, no packet, and/or noise. However, a non-packet event combined with a large power drop (e.g. 10 dB) can advantageously indicate a radar signal. Therefore, if step 705 detects a non-packet event, then step 710 can assert a radar event with a length equivalent to the counter value. If no physical error (non-packet error) occurs, which indicates a valid WLAN communication (e.g. an IEEE 802.11a/802.11b/802.11g packet), then step 706 can proceed to process the incoming signal normally. Note that step 706 can include any receiver gain adjustment to be performed. For example, if the incoming signal is actually a very strong WLAN packet, this signal will cause a large gain drop (step 703). In this case, the gains associated with the receiver are fixed until the non-packet event check is done (step 705). At this point (step 706), gain adjustment and subsequent processing of the strong WLAN packet can continue.

Note that gain adjustment is performed at different times in short pulse detection technique 500 and long pulse detection technique 700. Therefore, in one embodiment, to efficiently dovetail these techniques, step 701 of determining maximum power can be initiated any time after step 503. However, step 702 of starting the counter is preferably not started until after a non-packet event is not detected in step 507. In other words, step 508 of proceeding with normal signal processing could include steps 702–706 of FIG. 7. In one embodiment, step 701 could also be included in step 508, with some additional analysis time provided. Thus, short pulse detection technique 500 and long pulse detection technique 700 can be dovetailed or performed serially. Clearly, should a short radar pulse be detected, then long pulse detection need not be performed.

A number of different techniques may be utilized to determine a non-packet event. For example, such techniques could include preamble testing, self correlation of short sequences, signal field/data signal checks, transition to long sequences, self correlation of long sequences, parity checks, or testing certain allowable values for particular fields or lengths of fields. U.S. patent application Ser. No. 09/963,217, entitled "Method and System For Detecting False Packets In Wireless Communication Systems", filed Sep. 25, 2001 by Atheros Communications, Inc. and incorporated by reference herein, discloses a number of techniques that may be used to test for physical errors in incoming signals.

If no power drop occurs at step 703 and step 707 detects no non-packet event, then a WLAN signal is being received and step 706 can proceed to process the incoming signal normally. In contrast, if no power drop occurs at step 703, but a non-packet event is detected in step 707, then a radar signal is most likely being received.

At this point, step 708 can initiate a delay. In one embodiment, the delay is a wait period approximately equivalent to the longest known radar signal. In some embodiment, additional wait time may be included in this wait period to account for system response. The delay ensures that an opportunity exists to detect a power drop in the radar signal even if a very long radar signal is being received.

During the delay, if a drop in power of the strongest chain is detected in step 709, then step 710 asserts a radar event with a length equivalent to the counter value. If no drop in power of the strongest chain is detected, then step 711 initiates a time out of the delay period and step 712 asserts a radar event with a default length N. In one embodiment, the default length N can be a length greater than the identification codes used for any of the known signals.

Exemplary pseudo code for implementing signal power detection technique 700 immediately follows herein.

```
if max rssi(max rssi of the strongest chain) > radar_rssi_thresh
    initialize counter with consec_gainchanges
    if power (strongest chain)_drops before non-packet_event
        stop counter
        if non-packet_event
            assert radar_event, length=counter
        else
            proceed w/ packet as normal
        end
    else if non-packet_event before power (strongest chain)_drops
        delay non-packet_event
        set temp_length=radar_max_len
        if power(strongest chain)_drops
            assert radar_event, length =counter
        else if timeout
            assert radar_event, length =radar_max_len
        end
        else (no non-packet_event)
            proceed normally w/ packet
        end
    else
        proceed normally w/ packet
        report any errors normally & immediately
    end
```

In this pseudo code, "radar_rssi_thresh" refers to a predetermined threshold for a radar RSSI; "consec_gainchanges" refers to the number of gain changes performed (wherein the initial counter value can include the time needed to measure signal and start the radar detection process); "non-packet_event" refers to a flag indicating that a non-packet event has occurred during processing of the received signal; "temp_length" refers to a default value of radar length to be asserted upon timeout waiting for gain drop; and "radar_max_len" refers to a maximum expected length of the longest radar signal, plus some margin (the software could interpret receiving this value as a timeout to say that the power never dropped).

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

For example, although a WLAN device with multiple antennas is described, the short and long pulse detection techniques are equally applicable to WLAN devices having a phase shifting network or a filter network. In other words, the basis of each technique is using information from multiple process chains in the WLAN device, thereby allowing the WLAN device to quickly and efficiently detect radar pulses. Thus, the short and long pulse detection techniques could be used in a WLAN device connectable to a single antenna, but still having multiple processing chains.

For example, although the radar detection techniques have been described with reference to radar signals and WLAN communications, these techniques can easily be applied to other types of signals and communication formats. Thus, certain in-band signals could be avoided for performance reasons by designating such signals as priority signals.

Note that short pulse detection technique 500 (FIG. 5) and long pulse detection technique 700 (FIG. 7) can be implemented using software code that runs on a conventional general purpose computer, a specialized digital computer, or a microprocessor. Other embodiments can implement one or more portions of these techniques using application specific integrated circuits (ASICs) or by interconnecting an appropriate network of conventional component circuits.

Accordingly, it is intended that the scope of the invention be defined by the following Claims and their equivalents.

The invention claimed is:

1. A wireless local area network (WLAN) device for communicating via multiple receive chains, each receive chain including an antenna, the WLAN device comprising:
   a radar detection unit for detecting a potential radar signal based on an incoming signal from each antenna;
   code embodied on a computer readable medium, the code including a short pulse detection technique and a long pulse detection technique; and
   an analysis unit for identifying the potential radar signal based on results from the radar detection unit,
   wherein the radar detection unit and the analysis unit use the short pulse detection technique and the long pulse detection technique for analyzing the incoming signal.

2. The WLAN device of claim 1, wherein the analysis unit includes a lookup table of priority signals.

3. The WLAN device of claim 1, wherein the short pulse detection technique includes:
   determining whether the incoming signal includes a pulse;
   if a pulse is detected, then determining whether the incoming signal appears to include a non-radar communication;
   if the incoming signal does not appear to include a non-radar communication, then indicating a radar event.

4. The WLAN device of claim 3, wherein the short pulse detection technique further includes:
   if the incoming signal does appear to include a non-radar communication, then adjusting a gain of a corresponding receive chain and determining whether a non-packet event occurs; and if a non-packet event occurs, then indicating a radar event; and if a non-packet event does not occur, then processing the incoming signal as a non-radar signal.

5. The WLAN device of claim 1, wherein the short pulse detection technique further includes:
determining that at least one of the multiple receive chains provides an in-band signal;
if at least one of the multiple receive chains provides an in-band signal, then determining if a maximum power of a strongest receive chain is greater than a radar pulse threshold; and
if the maximum power of the strongest receive chain is greater than the radar pulse threshold and after the gain is quantized, then determining if the maximum power of the strongest receive chain is less than a low predetermined threshold, thereby verifying that a pulse has ended.

6. The WLAN device of claim 1, wherein the long pulse detection technique includes:
determining whether a maximum power of a strongest incoming signal as measured via all the antennas is greater than a predetermined threshold;
if the maximum power of the strongest incoming signal as measured on all the antennas is greater than the predetermined threshold, then starting a counter to measure a burst duration;
determining whether a significant power drop occurs on a chain corresponding to the strongest incoming signal after starting the counter;
if a significant power drop does occur, then stopping the counter and determining whether a non-packet event occurs.

7. The WLAN device of claim 6, wherein the long pulse detection technique further includes:
if a non-packet event occurs after stopping the counter, then indicating a radar event; and
if a non-packet event does not occur after stopping the counter, then processing the incoming signal as a non-radar signal.

8. The WLAN device of claim 7, wherein the long pulse detection technique further includes:
if a significant power drop on a strongest receive chain does not occur after starting the counter, then determining whether a non-packet event occurs;
it a non-packet event does not occur, then processing the incoming signal as a non-radar signal; and
if a non-packet event occurs, then initiating a delay;
after the delay, determining whether a significant power drop occurs;
if a significant power drop on the strongest receive chain occurs after the delay, then indicating a radar event having a counter length to the analysis unit; and
if a significant power drop on the strongest receive chain does not occur after the delay, then resetting the counter and indicating a radar event having a default length.

9. A method of identifying radar in a wireless local area network (WLAN) receiver, the receiver being in communication with multiple receive chains, each receive chain including an antenna, the method comprising:
detecting a potential radar signal based on incoming signals from each antenna, the detecting including a short pulse detection technique and a long pulse detection technique.

10. The method of claim 9, wherein the short pulse detection technique further includes:
determining that at least one of the multiple receive chains provides an in-band signal;
if at least one of the multiple receive chains provides an in-band signal, then determining if the maximum power of the strongest receive chain is greater than a radar pulse threshold; and
if the maximum power of the strongest receive chains is greater than a radar pulse threshold and after the gain has been properly quantized, then determining if the maximum power of the strongest receive chain is less than a low predetermined threshold, thereby verifying that the pulse has ended.

11. The method of claim 9, wherein the short pulse detection includes:
determining whether the incoming signal includes a pulse;
if a pulse is detected, then determining whether the incoming signal appears to include a non-radar communication;
if the incoming signal does not appear to include a non-radar communication, then indicating a radar event.

12. The method of claim 11, wherein the short pulse detection further includes:
if the incoming signal does appear to include a non-radar communication, then adjusting a gain of a corresponding receive chain and determining whether a non-packet event occurs; and
if a non-packet event occurs, then indicating a radar event; and
if a non-packet event does not occur, then processing the incoming signal as a non-radar signal.

13. The method of claim 9, wherein the long pulse detection includes:
determining whether a maximum power of a strongest incoming signal as measured via all of the antennas is greater than a predetermined threshold;
if the maximum power of the strongest incoming signal as measured on all of the antennas is greater than the predetermined threshold, then starting a counter to measure a burst duration;
determining whether a significant power drop occurs on a strongest receive chain after starting the counter;
if a significant power drop does occur, then stopping the counter and determining whether a non-packet event occurs.

14. The method of claim 13, wherein the long pulse detection further includes:
if a non-packet event occurs after stopping the counter, then indicating a radar event; and
if a non-packet event does not occur after stopping the counter, then processing the incoming signal as a non-radar signal.

15. The method of claim 14, wherein the long pulse detection further includes:
if a significant power drop on the strongest receive chain does not occur after starting the counter, then determining whether a non-packet event occurs;
it a non-packet event does not occur, then processing the incoming signal as a non-radar signal; and
if a non-packet event occurs, then initiating a delay;
after the delay, determining whether a significant power drop occurs;
if a significant power drop on the strongest receive chain occurs after the delay, then indicating a radar event having a counter length; and if a significant power drop on the strongest receive chain does not occur after the delay, then resetting the counter and indicating a radar event having a default length.

16. A software program for detecting radar implementable in a wireless local area network (WLAN) receiver, the software program being embodied on a computer readable medium, the receiver being able to communicate with multiple receive chains, each receive chain including an antenna, the software program embodied on the computer readable medium comprising:

code for detecting a potential radar signal based on an incoming signal from each antenna, the code for detecting including code for short pulse detection and code for long pulse detection.

17. The software program of claim 16, wherein the code for short pulse detection includes:

code for determining whether the incoming signal includes a pulse;

code for determining whether the incoming signal appears to include a non-radar communication if a pulse is detected; and code for indicating a radar event if the incoming signal does not appear to include a non-radar communication.

18. The software program of claim 17, wherein the code for short pulse detection further includes:

code for adjusting a gain of a corresponding receive chain and determining whether a non-packet event occurs if the incoming signal does appear to include a non-radar communication;

code for indicating a radar event if a non-packet event occurs; and code for processing the incoming signal as a non-radar signal if a non-packet event does not occur.

19. The software program of claim 16, wherein the code for short pulse detection further includes:

code for determining that at least one of the multiple receive chains provides an in-band signal, code for determining if a maximum power of a strongest receive chain is greater than a radar pulse threshold, if at least one of the signals on the multiple receive chains is an in-band signal, code for determining if the maximum power of the strongest receive chain is less than a low predetermined threshold, if the maximum power of the strongest receive chains is greater than a radar pulse threshold and after the gain has been properly quantized, thereby verifying that the pulse has ended.

20. The software program of claim 16, wherein the code for long pulse detection includes:

code for determining whether a maximum power of a strongest incoming signal as measured via all of the antennas is greater than a predetermined threshold;

code for starting a counter to measure a burst duration if the maximum power of the strongest incoming signal as measured on all of the antennas is greater than the predetermined threshold;

code for determining whether a significant power drop occurs on a strongest receive chain after starting the counter; and code for stopping the counter and determining whether a non-packet event occurs if a significant power drop does occur.

21. The software program of claim 20, wherein the code for long pulse detection further includes:

code for indicating a radar event if a non-packet event occurs after stopping the counter; and code for processing the incoming signal as a non-radar signal if a non-packet event does not occur after stopping the counter.

22. The software of claim 21, wherein the code for long pulse detection further includes:

code for determining whether a non-packet event occurs if a significant power drop on the strongest receive chain does not occur after starting the counter;

code for processing the incoming signal as a non-radar signal if a non-packet event does not occur; and code for initiating a delay if a non-packet event occurs;

code for determining whether a significant power drop on the strongest receive chain occurs after the delay;

code for indicating a radar event having a counter length to the analysis unit if a significant power drop on the strongest receive chain occurs; and code for resetting the counter and indicating a radar event having a default length if a significant power drop on the strongest receive chain does not occur.

23. A method of detecting a pulse using multiple receive chains, wherein each receive chain includes an antenna for receiving signals and associated components for signal processing, the method including:

determining that at least one of the signals on the multiple receive chains is an in-band signal;

determining that a maximum power of a strongest receive chain is greater than a predetermined threshold; and after quantizing gains for certain components in the multiple receive chains, determining that the maximum power of the strongest receive chain is less than a low predetermined threshold.

24. A method of detecting a pulse using multiple chains, wherein each receive chain includes components for signal processing, the method including:

registering a signal power on each receive chain during signal reception;

determining a maximum signal power for the multiple receive chains;

comparing the maximum signal power to a predetermined threshold;

if the maximum signal power exceeds the predetermined threshold, then initializing a counter; and determining whether a power drop of the receive chain associated with the maximum signal power and a non-packet event occurs, thereby indicating a pulse.

25. The method of claim 24, wherein if the power drop occurs, then storing a value in the counter, wherein the value represents a length of the pulse.

26. The method of claim 25, wherein if no power drop occurs, but the physical event and a time out condition do occur, then indicating a pulse.

27. A method of identifying radar in a wireless local area network (WLAN) receiver, the receiver being in communication with multiple receive chains, the method comprising:

detecting a potential radar signal based on an incoming signal from each receive chain, the detecting including a short pulse detection.

28. The method of claim 27, wherein the short pulse detection includes:

determining whether the incoming signal includes a pulse;

if a pulse is detected, then determining whether the incoming signal appears to include a non-radar communication;

if the incoming signal does not appear to include a non-radar communication, then indicating a radar event.

29. The method of claim 28, wherein the short pulse detection further includes:
- if the incoming signal does appear to include a non-radar communication, then adjusting a gain of a corresponding receive chain and determining whether a non-packet event occurs; and
- if a non-packet event occurs, then indicating a radar event; and
- if a non-packet event does not occur, then processing the incoming signal as a non-radar signal.

30. A method of identifying radar in a wireless local area network (WLAN) receiver, the receiver being in communication with multiple receive chains, the method comprising:
- detecting a potential radar signal based on an incoming signal from each receive chain, the detecting including a long pulse detection technique.

31. The method of claim 30, wherein the long pulse detection technique includes;
- determining whether a maximum power of a strongest incoming signal as measured via all antennas of the receive chains is greater than a predetermined threshold;
- if the maximum power of the strongest incoming signal as measured on all antennas is greater than the predetermined threshold, then starting a counter to measure a burst duration;
- determining whether a significant power drop occurs on a strongest receive chain after starting the counter;
- if a significant power drop does occur, then stopping the counter and determining whether a non-packet event occurs.

32. The method of claim 31, wherein the long pulse detection technique further includes:
- if a non-packet event occurs after stopping the counter, then indicating a radar event; and
- if a non-packet event does not occur after stopping the counter, then processing the incoming signal as a non-radar signal.

33. The method of claim 32, wherein the long pulse detection technique further includes:
- if a significant power drop on the strongest receive chain does not occur after starting the counter, then determining whether a non-packet event occurs;
- if a non-packet event does not occur, then processing the incoming signal as a non-radar signal; and
- if a non-packet event occurs, then initiating a delay;
- after the delay, determining whether a significant power drop occurs;
- if a significant power drop on the strongest receive chain occurs after the delay, then indicating a radar event having a counter length; and
- if a significant power drop on the strongest receive chain does not occur after the delay, then resetting the counter and indicating a radar event having a default length.

* * * * *